United States Patent [19]

Cohen

[11] Patent Number: 4,460,241
[45] Date of Patent: Jul. 17, 1984

[54] TELECOMMUNICATION SYSTEM WITH FIBERGUIDE SIGNAL FILTERING

[75] Inventor: Leonard G. Cohen, Holmdel, N.J.

[73] Assignee: AT&T Bell Laboratories, Murray Hill, N.J.

[21] Appl. No.: 256,982

[22] Filed: Apr. 24, 1981

[51] Int. Cl.³ .............................................. G02B 5/172
[52] U.S. Cl. .............................. 350/96.20; 350/96.18
[58] Field of Search ................ 350/96.18, 96.20, 96.23

[56] References Cited

U.S. PATENT DOCUMENTS 3,705,992 12/1972 Ippen et al. ...................... 350/96.18
3,875,422 4/1975 Stolen ............................... 350/96.18

OTHER PUBLICATIONS

Stewart, W. J., *Proceedings of the Optical Communication Conference*, Amsterdam, Sep. 17-19, pp. 12.3-1-12-.3-4.
Gloge et al., "Baseband Characteristics of Long Wavelength LED Systems", *Electronics Letters*, vol. 16(10), pp. 366-367, 5/1980.
Gloge et al., "High-Speed Digital Lightwave Communication", *Bell System Technical Journal*, vol. 59(8), pp. 1365-1382, 10/1980.
Gloge et al., "Multimode-Fiber Technology for Digital Transmission", *Proceed. of the IEEE*, vol. 68(10), pp. 1269-1273, 10/80.
Bergh et al., "Optical Sources for Fiber Transmission Systems", *Proceed. of the IEEE*, vol. 68(10), pp. 1240-1246, 10/1980.
Ogawa et al., "System Experiments Using 1.3 μm LED's", *Electronics Letters*, vol. 17(2), pp. 71-72, 1/22/81.

Primary Examiner—David K. Moore
Assistant Examiner—Robert E. Wise
Attorney, Agent, or Firm—Eugen E. Pacher

[57] ABSTRACT

The application pertains to fiberguide systems comprising signal sources having center wavelengths near an absorption peak in the loss spectrum of the fiber, with the systems having a link length of several km, preferably at least 5 km. The resulting "filtering" of the signal can be used advantageously. For instance, the repeater spacing of a LED-based multimode system can be increased if fiberguide having an absorption peak of appropriate strength located above the minimum chromatic dispersion wavelength of the fiber is used, and if the LED center wavelength is chosen to exceed that wavelength by a small amount. In particular, in silica-rich fiberguide, absorption peaks due to OH typically occur at about 1.24 μm and 1.39 μm, and the wavelength of minimum chromatic dispersion can be about 1.3 μm. In such systems according to the invention, the total fiber loss at 1.39 μm is typically at least about 0.5 dB/km above the background loss, and the center wavelength exceeds the minimum chromatic dispersion wavelength by at least about 10% of the signal spectral width, or about 0.01 μm, whichever is less. The filtering resulting from the presence of the two absorption peaks results in a narrowing of the signal spectrum, which in turn leads to, inter alia, an increase in the bandwidth of the fiberguide system, as is demonstrated by exemplary results. The filtering effect typically can also be advantageously applied in a variety of other situations, including, for instance, wavelength-multiplexed systems.

14 Claims, 7 Drawing Figures

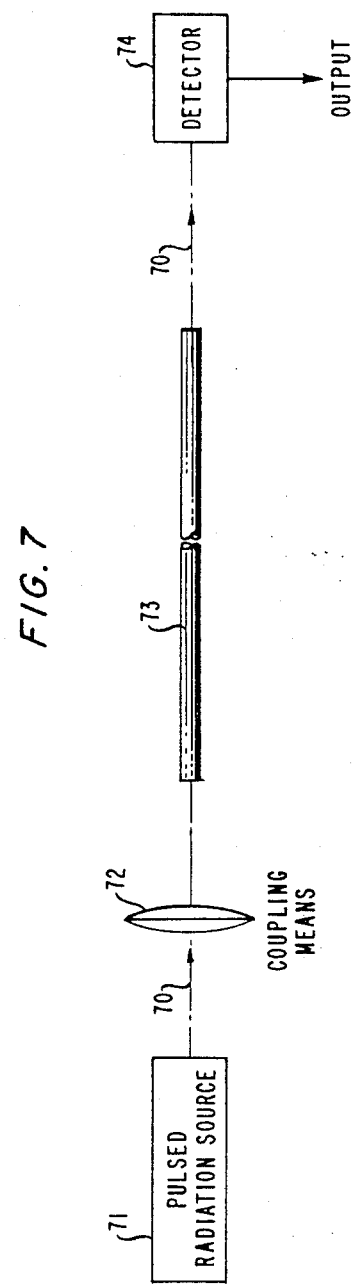

TELECOMMUNICATION SYSTEM WITH FIBERGUIDE SIGNAL FILTERING

FIELD OF THE INVENTION

This invention pertains to fiberguide telecommunication systems.

BACKGROUND

Lightwave telecommunication systems using glass fiberguides, often referred to simply as fibers, have recently achieved commercialization. Although the technology is finding use also in short-haul applications, e.g., on-premises applications, this invention is concerned with systems having relatively long link lengths, typically exceeding several kilometers, and the discussion will be confined accordingly.

Among the reasons for employing fiberguides in long distance systems are low transmission losses and large bandwidths. In particular, silica-rich fiberguides have been found to have low loss in the wavelength region near 1.3 $\mu$m, and have, or can be made to have, a first-order zero of the chromatic dispersion at or near that wavelength. For these and other reasons, wavelengths near 1.3 $\mu$m are of considerable interest for telecommunication systems employing silica-rich fiberguides.

Substantially all fiberguide communication systems use semiconductor light-emitting devices as sources. Two classes of devices are employed, namely, solid state lasers, and light-emitting diodes (LEDs). The two classes generally find distinct systems applications. Lasers are typically used in long range, high bit rate systems, whereas LEDs typically find application in lower bit rate and shorter range systems, where their lower output power and larger spectral width are adequate and the simpler electronic drive circuitry, lower cost, wider temperature range of operation, and higher reliability of LEDs makes their use attractive. Because of these and other advantages of LEDs over laser sources, ways of improving the performance of LED-based systems to result in increased link length and/or data transmission rate are of interest.

Considerable effort has been devoted to the analysis of high data rate fiberguide systems using LEDs having center wavelength of 1.3 $\mu$m. See, for instance, D. Gloge et al, *Electronics Letters*, Vol. 16(10), pp. 366–367 (1980), and D. Gloge et al, *The Bell System Technical Journal*, Vol 59(8), pp. 1365–1382 (1980), both of which are incorporated herein by reference. The former reports that a LED of typical spectral width can yield a chromatic dispersion bandwidth.distance product up to about 3.5 GHz.km, with the maximum product occurring at the wavelength of minimum chromatic dispersion of the fiber, assumed to occur at 1.3 $\mu$m. The latter reports that repeaterless operation over distances up to 8 km at 274 Mbits/sec is possible with cabled fiberguides having loss of 1 dB/km and a bandwidth.distance product of 1 Ghz.km, and LED sources having a center wavelength at the wavelength of minimum chromatic dispersion of the fiber, typically at 1.3 $\mu$m. In general, the prior art teaches operation of LED-based fiberguide telecommunication systems with source center wavelength equal to the wavelength of minimum chromatic dispersion of the fiberguide.

Since the first report of production of relatively low loss fiberguides, with losses of the order of several tens of dB/km, a large research and development effort has been directed towards lowering the signal attenuation in fiberguides, in particular, to reduction of losses due to material effects. These include light absorption by impurities, such as the hydroxyl radical (OH), and transition metal ions, in addition to the inherent ultraviolet and infrared absorption of the constituent glass, and Rayleigh scattering by refractive index inhomogeneities frozen into the glass. See, for instance, Tingye Li, *Proceedings of the IEEE*, Vol. 68(10), pp. 1175–1180, (1980). The technology of fiber fabrication has now advanced to such a high level that, at least in the laboratory, it is possible to produce fibers in which basically only intrinsic effects like Rayleigh scattering, and UV- and infrared absorption, cause appreciable losses, which will be referred to as the "background" loss. This means, inter alia, that the OH content of such fibers can be kept extremely low, since, for instance, an OH- level of about 1 ppm will give rise to a 30–40 dB/km absorption peak at about 1.39 $\mu$m. In some of the best multimode fibers an OH absorption of only about 0.5 dB/km above background at 1.39 $\mu$m has been achieved. Implicit in the prior art is thus the general teaching that it is advantageous to use fiberguide having the lowest possible loss at and near the wavelength of operations.

In summary then, the prior art teaches that LED-based fiberguide systems capable of relatively high data-rate operation are possible, provided the LED center wavelength is chosen to coincide with the wavelength of minimum chromatic dispersion of the fiberguide. In addition, the prior art recognized the necessity of lowering fiberguide attenuation to the greatest extent possible, and has substantially succeeded in this. In particular, prior art efforts have been successful in substantially eliminating the OH absorption peaks at about 1.39 $\mu$m and about 1.24 $\mu$m in silica-rich fiberguide material.

Also, it is known that transmission of a signal of finite bandwidth through a channel that has wavelength-dependent loss results in a "filtering" of the signal, i.e., a modification of the power spectrum of the signal.

SUMMARY OF THE INVENTION

I have found that "filtering" of the signal by the transmission medium, i.e., the fiber, can be used to advantageously affect system performance of fiberguide telecommunication systems. For instance, it can yield systems having larger bandwidth and/or link length than comparable prior art systems. The filtering effect is also advantageously taken into account in the design of wavelength multiplexed mono- or multimode systems.

The invention applies to telecommunication systems comprising one or more sources of pulsed electromagnetic radiation and one or more fiberguide links, and coupling means for optically coupling the fiberguide to the source. An advantageous application is in a system comprising fiberguide selected to have minimum chromatic dispersion at a first wavelength, and a loss peak at a second wavelength, centered near the first, of at least about 0.5 dB/km above the background, and the source selected to yield radiation having a center wavelength differing from the first wavelength by at least about 10% of the spectral width of the radiation, or 0.01 $\mu$m, whichever is less, in the direction towards the second wavelength.

The invention also applies to telecommunication systems comprising one or more sources of pulsed electromagnetic radiation having a first center wavelength, one or more fiberguide links optically coupled to the source, and means responsive to the radiation transmitted through the fiberguide. In a system according to the invention, the fiberguide is selected to have an absorption peak, centered at a second wavelength, of at least about 0.5 dB/km above the background loss at the second wavelength, and the radiation-responsive means are chosen to be optimally responsive not at the first wavelength but at a wavelength differing from the first wavelength by at least about 10% of the spectral width of the emitted radiation, or 0.01 µm, whichever is less, with the wavelength shifted away from the second wavelength.

The invention typically is applied in systems having link lengths of more than several km, preferably more than about 5 km. Such systems typically employ a multiplicity of radiation sources, either in repeaters, or as primary transmitters in systems comprising a multiplicity of repeaterless signal channels. By "link length" I mean repeater spacing, or transmitter/receiver distance in a repeaterless link.

An exemplary application of the filtering effect is in multimode systems using LED sources with center wavelength at or near 1.3 µm coupled to silica-rich fiberguide. Using, in such systems, fiberguides that have a non-negligible amount of OH absorption and LED sources having a center wavelength not at the wavelength of minimum chromatic dispersion of the fiberguide but rather at a somewhat longer wavelength can result in the above-mentioned improved long-haul performance characteristics. The improved performance results from the signal filtering caused by the OH absorption peaks at about 1.24 µm and 1.39 µm, and the consequent narrowing of the signal frequency spectrum. Exemplary techniques for determining optimum center wavelength, and optimum repeater spacing will be presented below.

BRIEF DESCRIPTION OF THE DRAWINGS

FIG. 7 depicts schematically a fiber telecommunication system useful in the practice of the invention.

DETAILED DESCRIPTION

Figure 1:
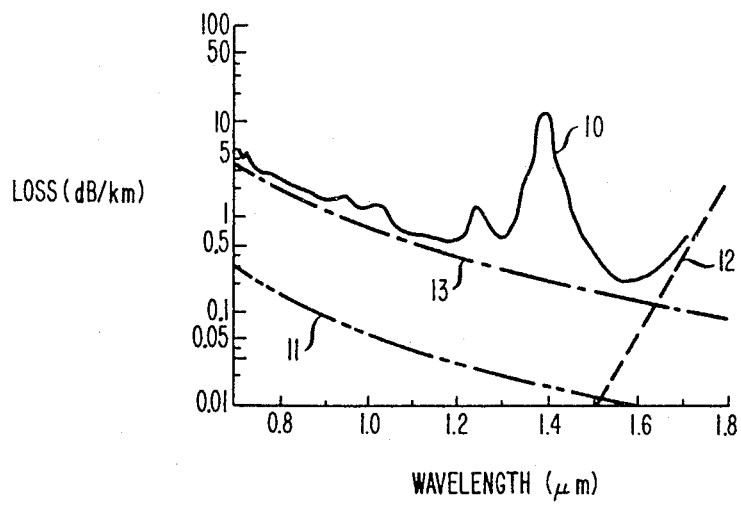
FIG. 1 shows fiber loss as a function of wavelength, for a germania-doped silica fiber.

The instant invention can be practiced with first telecommunication system exemplified by the system schematically depicted in FIG. 7, wherein radiation 70, emitted by pulsed radiation source 71 (e.g., an LED) is coupled by coupling means 72 (e.g., a focusing lens) into the first end of fiber 73, propagates therethrough, part of the radiation arriving at the second end of the fiber, being emitted therefrom, and being incident onto means, e.g., detector 74, whose output is responsive to the radiation.

I will now present a method useful for determining the effect of fiberguide filtering on a signal of finite spectral width. For definiteness this will be done for the case of a system using silica-rich multimode fiberguide and LED sources. It will be understood, however, that the method is exemplary, and that other approaches to determining and, if applicable, optimizing the effect of fiberguide filtering are possible. And furthermore, the filtering effect can be advantageously used with monomode fiber, in fiberguide comprising other material, and in systems using other than LED sources, such as, for instance, laser sources, provided the wavelength-dependence of the loss is sufficient to result in a substantial shift of the center wavelength of the signal.

As is well known, LED sources emit radiation over a considerable spectral range, with the spectral power density $P(\lambda)$ being approximately a Gaussian function of wavelength $\lambda$, such as is given in equation (1).

$$P(\lambda) \sim \exp[-(\lambda - \lambda_c)^2/2\sigma^2] \tag{1}$$

InGaAsP LEDs, which are currently considered promising for application near 1.3 µm, have a spectral width that is, inter alia, a function of the operating wavelength, and equation (2) has been found to describe this wavelength dependence quite well near 1.3 µm. Similar expressions are applicable to other LEDs.

$$\sigma = \lambda_c^2/40 \ \mu m \tag{2}$$

One thus sees that the $2\sigma$-width of the power spectral distribution is about 0.08 µm for a LED center wavelength $\lambda_c = 1.3$ µm.

The center wavelength of such an LED depends, inter alia, on the composition of the device. Since composition can be controlled quite closely, it is possible to manufacture InGaAsP LEDs as well as other LEDs to quite close tolerances. A typical distribution of individual device center wavelengths observed in production can be described by a Gaussian function, with an RMS width of typically about 0.04 µm. As InGaAsP technology matures, further narrowing of the observed distribution of center wavelengths is likely to occur.

It will now be shown that the performance characteristics of multimode fiberguide systems using silica-rich fiber and LED sources with wavelength near 1.3 µm can be improved by retaining some OH in the fiber and by using LEDs having center wavelength larger than the minimum chromatic dispersion wavelength of the fiberguide.

If OH is present in silica-rich fiberguides then two absorption peaks, at about 1.24 µm and about 1.39 µm, occur in the wavelength regime of interest to this application. The peaks are due to harmonics of a vibrational excitation of the OH radical, and thus have substantially fixed relative strength. In particular, the peak at 1.39 µm has about 25 times the strength in dB of the shorter wavelength peak. These and other features of absorption as a function of wavelength in a $GeO_2$-doped $SiO_2$ fiberguide are illustrated by FIG. 1. Curve 10 represents the measured loss of the fiber, showing a strong OH peak at about 1.39 µm, and a considerably weaker one at about 1.24 µm. FIG. 1 also shows the contributions made by UV absorption (11), infrared absorption (12), and Rayleigh scattering (13), constituting the background loss of the fiber.

Because of the simple structure of the loss as a function of wavelength, it is easily possible to model the loss of silica-rich fiber for some restricted wavelength regime, as will now be demonstrated. An example of a possible representation of the loss as a function of wavelength λ near 1.3 μm of silica-rich fiberguide is equation (3), in which the constants R, $\lambda_R$, A, $\lambda_1$, $\lambda_2$, $\sigma_1$ and $\sigma_2$ are to be chosen to fit the model function to a particular observed loss curve.

$$\text{Loss (dB/km)} = R(\lambda/\lambda_R)^{-4} + A\exp[-(\lambda-\lambda_1)^2/2\sigma_1^2] + 25A\exp[-(\lambda-\lambda_2)^2/2\sigma_2^2] \quad (3)$$

Rayleigh scattering is represented by the first term of equation (3), whereas the two Gaussians represent OH peaks, with relative strength of 1:25, to approximate the experimentally observed relative strengths of the peaks at $\lambda_1 = 1.24$ μm and $\lambda_2 = 1.39$ μm. The variances $\sigma_1$ and $\sigma_2$ can be chosen to fit the width of the respective Gaussians to experimental data. In the exemplary calculations discussed below, I have used $\sigma_1 = 0.035$ μm, $\sigma_2 = 0.042$ μm, R = 0.2 dB, and $\lambda_R = 1.55$ μm.

Figure 2:
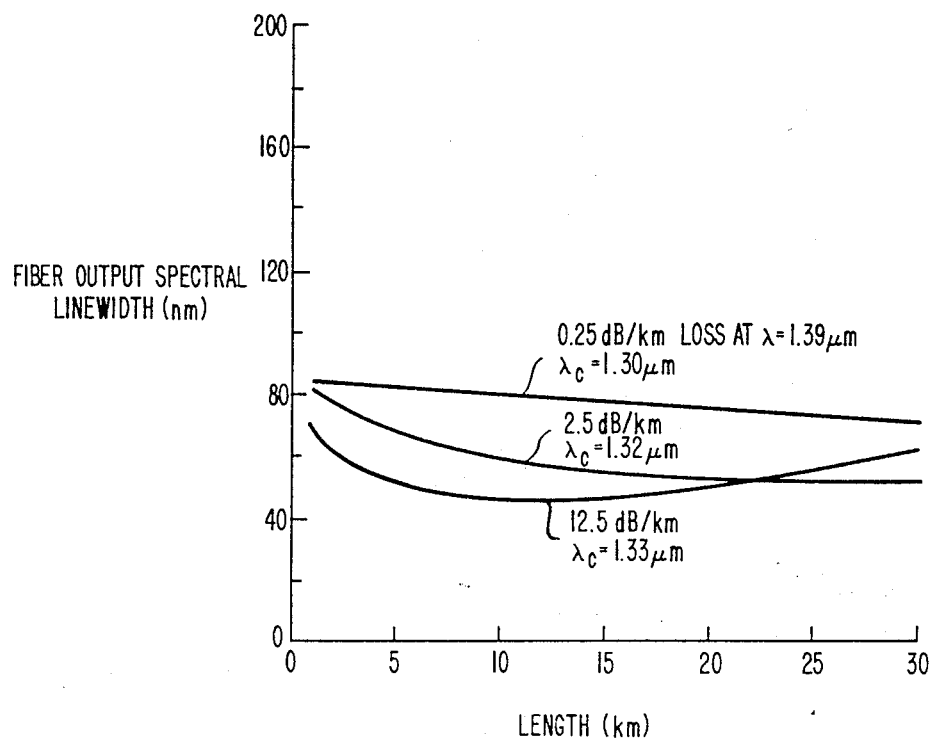
FIG. 2 shows computed results of LED-derived signal spectral width as a function of fiber length.

Using an appropriate loss function, such as, for instance, a function of the form of equation (3), one can compute the effect of transmission through a given length of fiber on the radiation emitted by e.g., a LED. Exemplary results are shown in FIG. 2. For the calculations, I assumed a spectral density of the source of the form given in equation (1), with a variance as given in equation (2), and a loss function as in equation (3), with A chosen to result in 0.25 dB/km, 2.5 dB/km or 12.5 dB/km loss peaks above background at $\lambda = 1.39$ μm, respectively. As can be seen from FIG. 2, the decrease in the output spectral linewidth is small, of the order of 15%, for a fiberguide link of 30 km, if the OH absorption in the fiber is small enough to result in OH-caused loss at 1.39 μm of only 0.25 dB/km, i.e., in substantially OH-free fiber, and if the center wavelength $\lambda_c$ of the LED is 1.30 μm. Fibers of increased OH-absorption result in increased output narrowing, in excess of 40% after about 30 km for 2.5 dB/km OH-caused loss at 1.39 μm and $\lambda_c = 1.32$ μm, and similarly after about 10 km for 12.5 dB/km and $\lambda_c = 1.33$ μm. However, in the last case, the linewidth increases again, after attaining a minimum near about 12 km, due to the relatively lower loss of the long-wavelength tail of the LED output.

Results of the kind presented in FIG. 2 exemplify the fiberguide filtering effect. In general, they teach that an absorption peak having at least about 0.5 dB/km above the background is required to result in significant filtering. In particular, the results show that for OH-peaks at about 1.24 μm and about 1.39 μm, the filtering consists typically of a narrowing of the output spectrum and a down-shift of the center wavelength of the signal if $\lambda_c$ of the LED is greater than 1.30 μm, but less than 1.39 μm.

Figure 3:
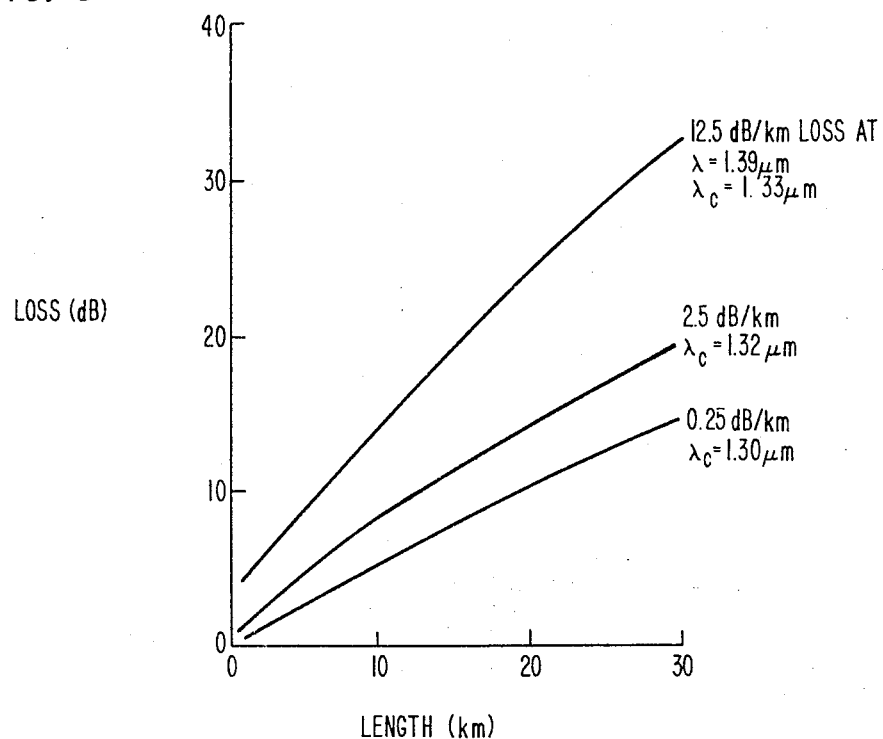
FIG. 3 gives computed results of total signal loss as a function of fiber length.

Results of exemplary loss calculations for fiber links of up to 30 km length are presented in FIG. 3. Here as well as in all the other exemplary calculations discussed herein, $\lambda_o$, the wavelength of minimum chromatic dispersion of the fiber, was assumed to be 1.30 μm. The LED center wavelengths for which data are represented are those for which the fiberguide filtering resulted in a shift of the mean wavelength of the power spectrum to approximate coincidence with $\lambda_o$ after propagation halfway through the fiber, i.e., after 15 km in the instant examples. This is one convenient criterion for determining an improved LED center wavelength $\lambda_c$ for any given fiberguide and link length, but other criteria can be used. FIG. 3 shows relatively higher incremental fiber losses for short fiber lengths, due typically to the filtering by the OH-peaks that results in the narrowing of the signal spectrum, with the incremental losses decreasing after the first few kilometers, and approaching 0.47 dB/km, 0.8 dB/km, and 2 dB/km for fibers having 0.25 dB/km, 2.5 dB/km, and 12.5 dB/km OH-caused loss at 1.39 μm, respectively.

If mode dispersion in a fiberguide telecommunication system is relatively small, as can be the case in systems using well-designed and manufactured multimode fiber, then the above-described filtering effects can be used to significantly improve the transmission characteristics of such a system, as will now be discussed and demonstrated.

As was pointed out by Gloge et al, *Electronics Letters*, Vol. 16(10), pp. 366-367 (1980), the signal transfer characteristics of a multimode fiberguide can typically be modeled in the frequency domain by the product of two filter functions, one describing chromatic dispersion and the other mode dispersion. Since the latter will not be considered in this application, the transfer function H(f) of the fiberguide is considered herein to be equal to the "chromatic dispersion" transfer function $H_c(f)$, where f denotes frequency. $H_c(f)$ can then be calculated, for instance, as in Gloge et al (ibid), or equivalently, by the approximate expression given in equation (4).

$$H_c(f,L) \sim \int_{\lambda_a}^{\lambda_b} P_o(\lambda,L)\exp\left\{\frac{-2\pi i f S}{c}\left[\frac{(\lambda_c - \lambda_o)(\lambda - \lambda_c)}{\lambda\lambda_c} + \frac{(\lambda_c - \lambda)^2}{2\lambda^2}\right]\right\}\frac{d\lambda}{\lambda^2} \quad (4)$$

In equation (4), L is the length of the fiber link, c is the speed of light in vacuum, i the imaginary unit, and S a material constant representative of measured chromatic dispersion curves, with S = 0.05 for λ near $\lambda_o$. $P_o(\lambda, L)$ is the signal power distribution at the fiber output end, and can be computed from a known LED input spectrum (e.g., equations (1) and (2)) with the use of an appropriate fiberguide filter function, e.g., equation (3). The range of integration is to be large enough to result in a stationary value of the integral. Equation (4) is valid for $\lambda_c$ in the vicinity of $\lambda_o$, e.g., for a LED-based system in which the center wavelength of the diode is near the wavelength of minimum chromatic dispersion of the fiberguide.

Determination of $H_c(\lambda, L)$, for instance, by evaluating the approximate expression given in equation (4), permits determination of the chromatic-dispersion-limited fiber transmission bandwidth, typically from the 3-dB roll-off frequency of $H_c(f, L)$. One typically finds that offsetting $\lambda_c$ to a wavelength greater than $\lambda_o$ (but of course less than $\lambda_2$) results in an increase in this bandwidth over that resulting when $\lambda_o = \lambda_c$. For instance, it is found that for fibers having total OH-caused loss at 1.39 μm of 2.5 and 12.5 dB/km, the preferred LED center wavelengths are 1.32 and 1.33 μm, respectively, if the link length is 30 km, and $\lambda_o = 1.30$ μm. In general, it is found that, in order to achieve a significant improvement $\lambda_c$ should typically be between $\lambda_o$ and the loss peak, and differ from $\lambda_o$ by at least about 10% of the spectral width of signal, or 0.01 μm, whichever is less.

Figure 4:
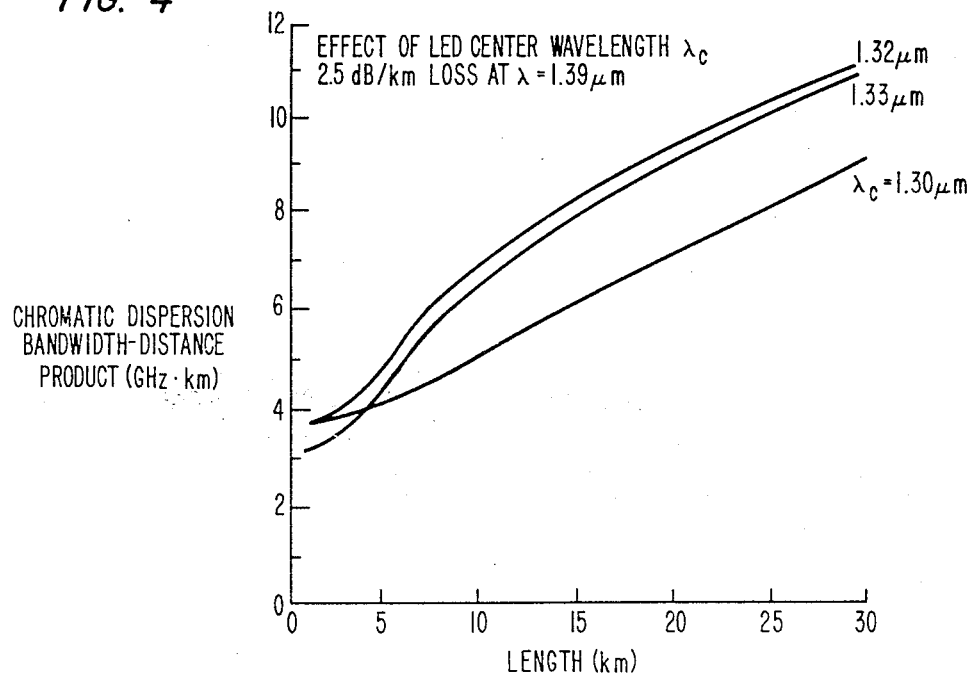
FIG. 4 shows computed results of chromatic dispersion bandwidth.distance product as a function of fiber length, for these different LED center wavelengths.

FIG. 4 illustrates the effect of LED center wavelength $\lambda_c$ on the chromatic-dispersion-bandwidth.distance product as a function of link length for fiberguide having OH-caused loss of 2.5 dB/km at 1.39 μm. The figure shows that, for instance, the normalized signal output bandwidth due to an LED with $\lambda_c=1.30$ μm is successively increased from about 3.8 GHz.km after 1 km to about 9 GHz.km after 30 km due to progressive filtering by the fiber, but that the normalized bandwidth after 30 km is further increased from about 9 GHz.km to about 11.2 GHz km by offsetting $\lambda_c$ from $\lambda_o$ to 1.32 μm. Other exemplary calculations show that the normalized chromatic bandwidth increases from about 3.4 to 9.0 GHz.km and from about 6.8 to 10.5 GHz.km for signals propagating within 1 to 30 km long fibers with 1.39 μm OH-caused loss of 0.25 db/km and 12.5 db/km, respectively, and $\lambda_c=1.30$ μm and 1.33 μm, respectively. FIG. 4 also indicates that typically several km of link length, preferably more than about 5 km, are necessary for the advantage of the inventive approach to become significant.

Next I will describe a method for assessing the dispersion noise penalty incurred in a fiberguide telecommunication system. I will then use these results to determine optimal link lengths, and thereby demonstrate further advantages of a system according to the invention over prior art systems.

Typically, fiberguide telecommunication systems employ pulse code modulation. In such systems, or more generally, in digital systems, pulse spreading causes intersymbol interference in the form of pulse overlap. This interference increases the transmission error probability over that set by the signal level and the receiver noise. In principle, overlapping pulses can be separated by equalization, i.e., high-frequency enhancement, in the receiver, but this also enhances receiver noise, thereby reducing the receiver sensitivity relative to what it would be in the case of nonoverlapping pulses. This degradation of receiver sensitivity represents the power penalty associated with equalization of receiver response. This penalty can be calculated, as shown by D. Gloge et al, *The Bell System Technical Journal*, Vol. 59(8), pp. 1365-1382 (1980).

Figure 5:
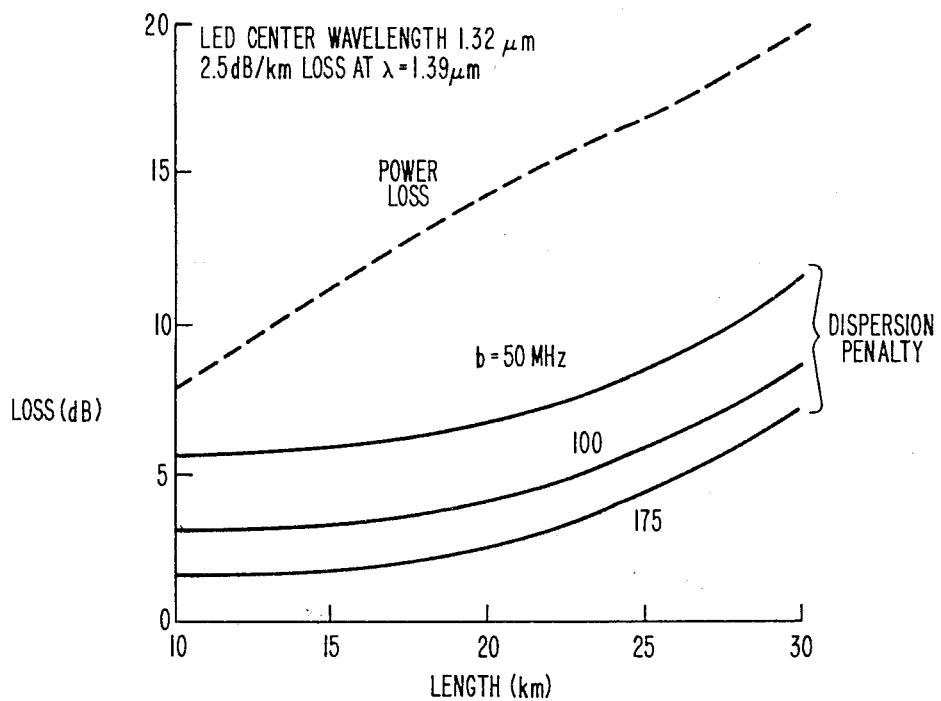
FIG. 5 shows computed loss and dispersion penalty as a function of fiber length.

FIG. 5 shows results of such calculations, for a system employing fiber having 2.5 dB/km OH-caused loss at 1.39 μm, and an LED source with center wavelength of 1.32 μm, i.e., 0.02 μm above the assumed wavelength of minimum chromatic dispersion, and operated at a bit rate of 274 Mb/s. The 3 dB electrical bandwidths of the LED sources, b=50, 100, and 175 MHz, are the parameters for the dispersion penalty curves. The dispersion penalties shown consist of two contributions, one due to the finite source spectral width, and the other one due to the fiber. The former are 5.6 dB, 3.1 dB, and 1.6 dB for b=50, 100 and 175 MHz, respectively, and the latter are quite small, becoming greater than 1 dB for fiber lengths greater than about 20 km. If $\lambda_c$ had been chosen to be 1.30 μm instead, then the 1 dB fiber dispersion penalty would have occurred at a considerably shorter fiber length, namely at about 13 km. Similar calculations for fiber having total loss of 12.5 dB/km at 1.39 μm, with $\lambda_c=1.33$ μm, show that source chromatic dispersion penalties in that case are approximately the same as those found for the conditions of FIG. 5, and that the fiber dispersion penalty exceeds 1 dB for fiber lengths greater than about 23 km.

The maximum link length for a fiberguide telecommunication system having a given loss per unit length is determined by the difference between the optical signal power coupled into the fiberguide at the transmitter end and the minimum detectable signal power at the receiver end. In an exemplary LED-based system, the available signal power is about 50 μW for a source with electrical bandwidth b=50 MHz (−13 dBm) (see, for instance, D. Gloge et al, ibid), and thus, since generally signal power is proportional to $b^{-1}$, is about −16 dBm for b=100 MHz, and −18 dBm for b=175 MHz. Since the minimum detectable signal is about −43 dBm (ibid), available signal margins in the exemplary system are about 30, 27, and 25 dB for b=50, 100, and 175 MHz, respectively.

In addition to the fiberguide losses discussed above, fiberguide telecommunication links typically are subject to additional losses due to, e.g., cabling and splicing. These losses are assumed to amount to approximately 0.3 dB/km for the instant exemplary system.

Figure 6:
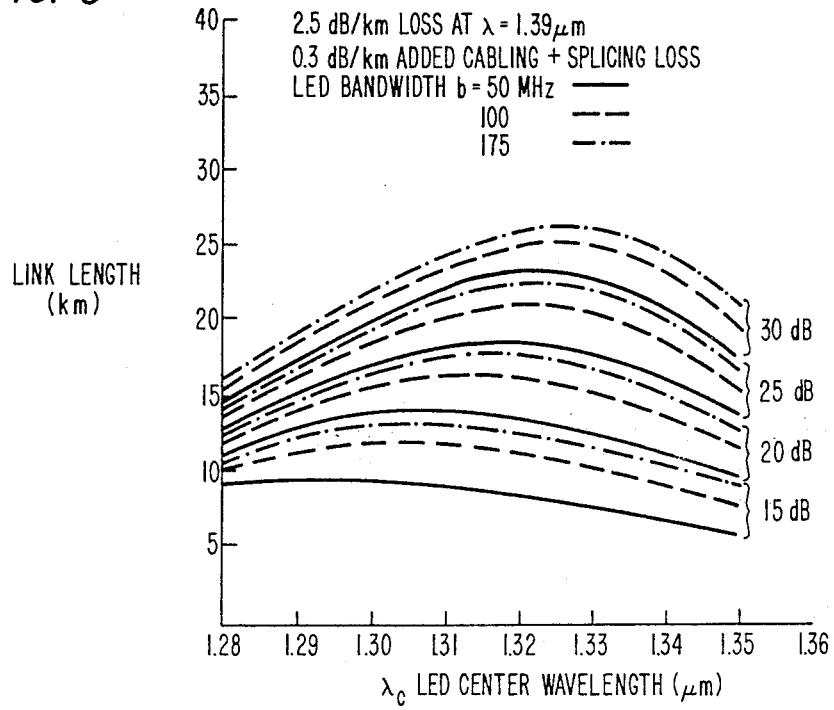
FIG. 6 presents computed data on maximum link lengths as a function of LED center wavelength, for three different LED bandwidths, and for four different values of maximum allowable loss.

FIG. 6 shows computed chromatic-dispersion-limited link lengths as a function of LED center wavelength for LED-based fiberguide systems, operating at a bit rate of 274 Mb/s, that employ fiber having OH-caused loss of 2.5 dB/km at $\lambda=1.39$ μm, with added loss of 0.3 dB/km. Parameters are LED electrical bandwidth, and link signal margins.

The calculations show that chromatic-dispersion-limited link lengths are approximately 23 km for signal margins of 30, 27, and 25 dB, corresponding to LED electrical bandwidths of 50, 100, and 175 MHz, respectively, and that maximum link lengths are realized for systems employing LEDs with center wavelength greater than 1.30 μm. Similar results are found for systems using fiber having 12.5 dB/km OH-caused loss at 1.39 μm, for signal margins of 30 and 25 dB, with maximum repeater spacings being 10 and 9 km shorter, respectively, than for the 2.5 dB/km fiber system discussed above. For lower signal margins the maximum spacing is found to occur for $\lambda_c$ at or slightly below 1.30 μm.

The method outlined above, as well as other equivalent methods, can be used to optimize system parameters. For instance, it can be used to choose $\lambda_c$ and fiber loss (e.g., minimum and maximum strength of the OH-peak at $\lambda=1.39$ μm) in order to maximize chromatic-dispersion-limited bandwidth for a system to be operated at a predetermined data transmission rate. Typically, the absorption peak must have enough strength to provide sufficient filtering, with a reasonable lower limit being about 0.5 dB/km and preferably about 1 dB/km, above the background fiber loss.

Furthermore, in systems that are analogous to the exemplary system discussed above, the LED center wavelengths $\lambda_c$ typically exceed the wavelength of minimum chromatic dispersion of the fiber by a substantial amount. Because of the rather close tolerances to which sources, e.g., InGaAsP diodes, can be fabricated, it is relatively easy to select the $\lambda_c$ of all the sources in a system according to the invention within specified narrow limits, and it is similarly easy to distinguish systems according to the invention from prior art systems, for instance, systems in which $\lambda_c=\lambda_o$, the wavelength of minimum chromatic-dispersion. For instance, assuming that the LED manufacturing process yields a population having center wavelengths normally distributed about the target $\lambda_c$ with a variance of 0.02 μm, that an inventive system calls for $\lambda_c=\lambda_o+0.01\pm0.005$ μm, then the probability is only about 25% that a prior art system having $\lambda_c=\lambda_c\pm0.02$ μm will contain a LED within the range specified for the inventive system. Since the invention typically will be practiced with systems comprising a multiplicity of LED sources, it is clear that the probability of accidentally constructing a prior art system having all LED center wavelengths in the range appropriate for an analogous inventive system rapidly decreases. For instance, under the above assumptions, that probability is less than about 2% for a system containing 3 LEDs.

Although application of the invention has been illustrated by means of a system operating at one wavelength near the wavelength of minimum chromatic dispersion of the fiberguide, other ways of advantageously using the filtering effect will be apparent to those skilled in the art. For instance, in wavelength-multiplexed systems the effect results, for signals of appropriate center wavelength and spectral width, in filtering that typically is not the same for all the various signal bands. Thus, for instance, some or all of radiation-responsive means at the receiver end of the fiber channel, typically comprising de-multiplexers comprising narrow-band filters, are advantageously designed to be optimally sensitive at wavelengths appropriately offset from the respective center wavelengths of the input signals, and/or to respond to a narrower signal spectrum than that of the respective input signals. Such systems according to the invention typically also employ fiberguide selected to have at least one loss peak, centered at a wavelength near the signal wavelengths, of strength sufficient to yield at least about 0.5 dB/km loss above the background.

The filtering results typically in a shift of the center wavelength of the signal away from the center wavelength of the absorption peak. Since systems according to the invention can employ signal sources greatly differing in spectral purity, such as, for instance, LEDs and lasers, it is difficult to define an absolute lower limit for the shift of the center wavelength. However, a shift by at least about 10% of the spectral width of the input signal, or 0.01 $\mu$m, whichever is less, is a substantial shift that can be easily detected, and that can have substantial design and system performance consequences. For instance, in the above-described exemplary LED-based system, selecting LEDs with center wavelength exceeding the wavelength of minimum chromatic dispersion by about 0.008 $\mu$m (i.e., about 10% of the spectral width) can result, for instance, in a substantial improvement in possible repeater spacing, as exemplified by the data shown in FIG. 6.

What is claimed is:

1. A telecommunication system comprising
    (a) at least one source of pulsed electromagnetic radiation, the radiation having a center wavelength and a spectral width,
    (b) at least one fiberguide link, the fiberguide having minimum chromatic dispersion at a first wavelength, and a loss spectrum comprising a background loss and at least one absorption peak, and
    (c) means for coupling at least part of the emitted radiation into the fiberguide,
    characterized in that
    (d) the fiberguide is selected to have an absorption peak, centered at a second wavelength near the first wavelength, of strength sufficient to result in a fiber loss of at least about 0.5 dB/km above the background loss at the second wavelength, and
    (e) the source is selected to have the center wavelength of the emitted radiation between the first and second wavelengths and differing from the first wavelength by at least about 10% of the spectral width, or 0.01 $\mu$m, whichever is less.

2. A system according to claim 1 wherein the source of pulsed radiation is a light emitting diode (LED).

3. A system according to claim 2 wherein the fiberguide is a multimode fiberguide comprising silica-rich material.

4. A system according to claim 1 wherein the fiberguide comprises silica.

5. A telecommunication system comprising
    (a) at least one source of pulsed electromagnetic radiation, the emitted radiation having a first center wavelength and a spectral width,
    (b) at least one fiberguide transmission link having a loss spectrum comprising a background loss and at least one absorption peak,
    (c) means for coupling at least a part of the emitted radiation into the fiberguide, and
    (d) means responsive to the radiation transmitted through the fiberguide,
    characterized in that
    (e) the fiberguide is selected to have an absorption peak, centered at a second wavelength, of strength at least about 0.5 dB/km above the background loss of the fiberguide at the second wavelength, the absorption peak resulting in differential absorption over the spectral width of the pulse, thereby causing a shift of the center wavelength of the transmitted radiation, and
    (f) the means responsive to the transmitted radiation are selected to be optimally responsive to radiation having a center wavelength shifted from the first center wavelength by at least about 10% of the spectral width, or 0.01 $\mu$m, whichever is less, in the direction of the shift of the center wavelength of the transmitted radiation.

6. A system according to claim 5 wherein the means responsive to the transmitted radiation are wavelength de-multiplexing means.

7. A system according to claim 6 wherein the de-multiplexing means comprise radiation filters.

8. A system according to claim 7 wherein the fiberguide comprises silica-rich material.

9. A telecommunication system comprising
    (a) at least one light-emitting diode source of electromagnetic radiation, and
    (b) at least one multimode fiberguide link comprising silica, having minimum chromatic dispersion at a wavelength near 1.3 $\mu$m and a loss spectrum comprising a background loss and at least one absorption peak, and
    (c) means for coupling at least part of the emitted radiation into the fiberguide,
    characterized in that
    (d) the fiberguide is selected to have an absorption peak at approximately 1.39 $\mu$m of strength sufficient to result in loss of at least about 0.5 dB/km above the background loss at that wavelength,
    (e) the diode source is selected to emit radiation having a center wavelength greater than the wavelength of minimum chromatic dispersion of the fiberguide by at least about 0.01 $\mu$m, but less than the wavelength of the absorption peak.

10. A system according to claim 9 wherein the fiberguide link comprises a multiplicity of repeaters, with repeater spacings greater than about 5 $\mu$m.

11. A system according to claim 9 comprising a multiplicity of repeaterless transmission links, with at least one link having a link length greater than about 5 km.

12. A telecommunication system comprising
(a) a multiplicity of light-emitting diode sources of electromagnetic radiation, and
(b) at least one multimode fiberguide transmission link, the fiberguide comprising silica, having minimum chromatic dispersion at a wavelength near 1.3 μm and a loss spectrum comprising a background loss and at least one absorption peak, and
(c) means for coupling at least part of the emitted radiation into the fiberguide,
characterized in that (d) the fiberguide is selected to have an absorption peak at approximately 1.39 μm of strength sufficient to result in loss of at least about 0.5 dB/km above the background loss at that wavelength, and
(e) the diode sources are selected to emit radiation having a center wavelength greater than the wavelength of minimum chromatic dispersion of the fiberguide by at least about 0.01 μm, but less than the wavelength of the absorption peak.

13. A system according to claims 9 or 12 wherein the diode source is a InGaAsP diode.

14. A system according to claim 12 wherein the fiberguide link has at least one link length greater than about 5 km.

* * * * *

UNITED STATES PATENT AND TRADEMARK OFFICE
CERTIFICATE OF CORRECTION

PATENT NO. : 4,460,241
DATED : July 17, 1984
INVENTOR(S) : Leonard G. Cohen

It is certified that error appears in the above-identified patent and that said Letters Patent is hereby corrected as shown below:

Column 3, line 59, "first" should read --fiber--. Column 5, line 33, after "$\sim$", --$f$-- should be added. Column 8, line 68, "$\lambda_c = \lambda_c \pm 0.02~\mu m$" should read --$\lambda_c = \lambda_o \pm 0.02~\mu m$--.

Signed and Sealed this

Sixteenth Day of April 1985

[SEAL]

Attest:

DONALD J. QUIGG

*Attesting Officer*     Acting Commissioner of Patents and Trademarks